(12) United States Patent
Punera et al.

(10) Patent No.: US 8,666,916 B2
(45) Date of Patent: Mar. 4, 2014

(54) METHOD FOR SUMMARIZING EVENT-RELATED TEXTS TO ANSWER SEARCH QUERIES

(75) Inventors: Kunal Punera, San Francisco, CA (US); Deepayan Chakrabarti, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 319 days.

(21) Appl. No.: 13/178,396

(22) Filed: Jul. 7, 2011

(65) Prior Publication Data

US 2013/0013535 A1    Jan. 10, 2013

(51) Int. Cl.
   *G06F 15/18* (2006.01)
(52) U.S. Cl.
   USPC .......................................................... 706/12
(58) Field of Classification Search
   USPC .......................................................... 706/12
   See application file for complete search history.

(56) References Cited

U.S. PATENT DOCUMENTS

| | | | |
|---|---|---|---|
| 7,734,629 B2* | 6/2010 | Chakrabarti et al. | 707/740 |
| 7,870,474 B2* | 1/2011 | Chakrabarti et al. | 715/205 |
| 7,921,073 B2* | 4/2011 | Agarwal et al. | 707/603 |
| 7,974,934 B2* | 7/2011 | Ravikumar et al. | 706/12 |
| 7,987,417 B2* | 7/2011 | Chakrabarti et al. | 715/205 |
| 8,255,793 B2* | 8/2012 | Chakrabarti et al. | 715/234 |
| 8,346,754 B2* | 1/2013 | Ravikumar et al. | 707/709 |
| 8,407,286 B2* | 3/2013 | Punera et al. | 709/204 |
| 8,522,327 B2* | 8/2013 | Broder et al. | 726/7 |
| 2012/0150773 A1* | 6/2012 | DiCorpo et al. | 706/12 |

* cited by examiner

*Primary Examiner* — Michael B Holmes
(74) *Attorney, Agent, or Firm* — Hickman Palermo Truong Becker Bingham Wong LLP

(57) ABSTRACT

A method and apparatus for receiving training data that comprise a plurality of event-and-time-specific texts that are contextually related to a plurality of events; iteratively processing the training data to generate a modified network model that defines a plurality of states; receiving additional data that comprise a plurality of additional event-and-time-specific texts that are contextually related to a particular event; processing the additional data by applying the modified network model to the additional data to identify, within the plurality of additional event-and-time specific texts, a particular set of texts that belong to a particular state of the plurality of states; identifying, within the particular set of texts, one or more texts that are most representative of all texts in the particular set of texts that belong to the particular state; wherein the method is performed by one or more special-purpose computing devices.

28 Claims, 7 Drawing Sheets

METHOD FOR SUMMARIZING EVENT-RELATED TEXTS TO ANSWER SEARCH QUERIES

FIELD OF THE INVENTION

Techniques of the present disclosure relate to processing textual information, and more specifically to identifying texts in a set of texts that are representative of the content of texts in the set.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

While generating search results to a query, search engines routinely display links to relevant tweets, blogs and other textual content. However, even though the search engines organize and chronologically order the texts that match the query, the search engines rarely analyze the content of the texts, and rarely determine a summary of the information included in the returned texts. Quite often, the search engines return the text links without determining whether the content of the texts is indeed representative of the information requested by the search query.

A great deal of the Internet searches pertains to searches for information about sport events, entertainment events, and other social or political events. While there seems to be a large supply of the Internet-based tweets, blogs and other texts related to such events, the content of some of those texts can be marginally useful to a user. For example, the tweets that merely mention the name of a particular event provide very little information to a user who is looking for a comprehensive summary of the particular event.

Furthermore, merely returning the most recently posted texts about a particular event requested in a search query can be rather useless to a user if the texts simply repeat the already posted information or if the texts marginally describe the particular event. For example, returning the texts that just repeat the search query terms but fail to provide details about the particular event may not be the expected search results.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
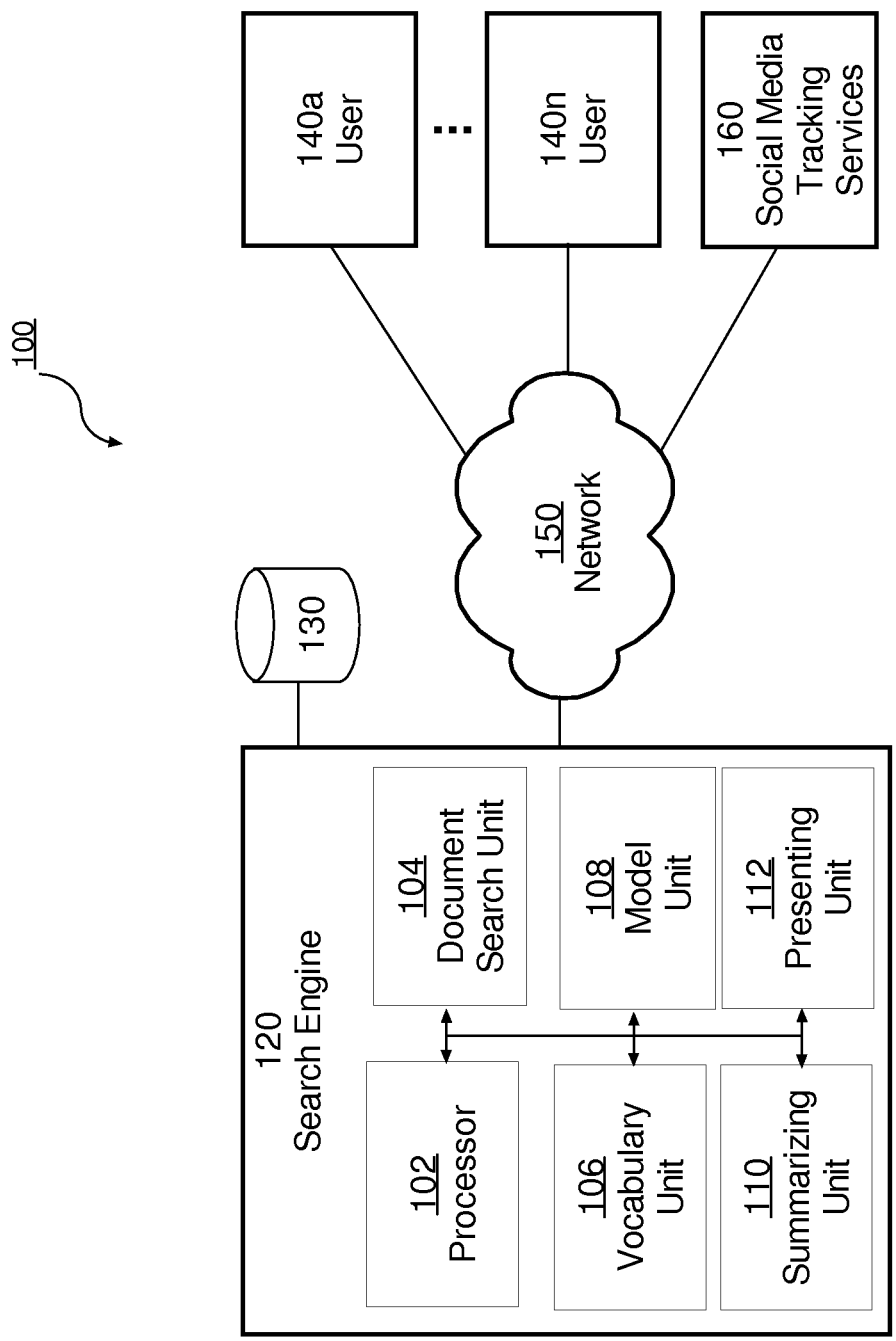
FIG. 1 illustrates an embodiment of a search engine environment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 State Model
4.0 Processing Event-And-Time-Specific Texts
5.0 Processing Search Results to Return Representative Texts
6.0 Implementation Mechanisms—Hardware Overview
7.0 Extensions and Alternatives 1.0 General Overview Techniques disclosed herein include approaches for constructing real-time summaries of events from texts provided by a search engine. The texts can relate to various events, such as sport games, concerts, political events, social events, and other events that members of social media can consider as interesting. The texts can also relate to information about public figures, celebrities, sport teams, entertainers, and other entities that can be interesting to the members of social media. The examples of the texts can comprise tweets, blogs, emails and other texts exchanged by the social media members.

The presented approach allows identifying one or more texts, in a set of texts, that are related to a particular event and that are the most representative of the content included in the set of texts.

2.0 Structural and Functional Overview

In an embodiment, the method is presented for summarizing event-specific real-time information included in a set of event-related texts to determine a subset of texts that are the most representative of the event summary. For example, for a particular event such as a football season, a collection of tweets can be used to summarize the football games, and to determine the tweets that are the most representative of a particular football game or the most representative of a portion of the particular football game.

In an embodiment, the method comprises generating a modified network model that represents an underlying structure of a group of related events. The modified network model is developed using training texts that describe related events occurring in the past. Once the modified network model is developed, the model can be applied to a stream of additional texts pertaining to the related events to determine the most relevant texts in the stream.

In an embodiment, the approach is based on generating an underlying model representation of an event. One of the goals is to detect event descriptions in a stream of texts and to summarize the structure of rich events. This can be achieved by extracting those texts from a stream of texts that are the most representative of the chain of interesting sub-events in a particular event.

In an embodiment, learning of the underlying model representation of an event involves identifying repeated events that share a similar underlying structure. For example, in the case of the football season events, each individual football game can share the same underlying structure, comprising touchdowns, interceptions, fumbles, penalties and field goals. However, each individual game is unique in terms of the participating players, the sequences of touchdowns and fumbles, and the outcome of the game.

In an embodiment, an underlying model representation of an event is learned from the information about the past events, and allows summarizing the current or ongoing events. Using this approach, search results generated for a received search query can contain the texts that are the most representative of the current event and that comprise a full summary of the key occurrences in the current event.

In an embodiment, generating a modified network model allows segmenting an event timeline into individual segments (states). The modified network model can be generated using training data that comprise a plurality of event-and-time-specific texts that are contextually related to a plurality of events. For example, in the case of a football season, a collection of football games played during a particular season can be used to generate a modified network model and to determine various phases (states) of a typical football game and to determine a vocabulary specific to a typical football game.

In an embodiment, training data are referred to as event-and-time-specific texts that can relate to various documents and can be presented in various forms. For example, the texts can relate to sport events, concerts, political events, social events, etc.

In an embodiment, event-and-time-specific texts can be presented in a form of tweets, blogs, emails or other written messages that users communicate with each other. The tweets, blogs and other texts can be sent via the Internet using various applications and from various sources.

In an embodiment, event-and-time-specific texts are tweets exchanged by the users communicating via the Internet. The tweets can be collected using a variety of approaches. For example, the tweets can be intercepted by various software applications residing on servers or other specialized computers In an embodiment, generating a modified network model comprises initializing various parameters for the model and iteratively processing training data, such as event-and-time-specific texts that are contextually related to a plurality of events. Furthermore, generating the modified network model can comprise determining initial values for the parameters of the model, and refining the values of the parameters by iteratively processing the training data. For example, as the training data are iteratively processed, one or more states of the modified network model can be determined as specific to the plurality of events. For example, by iteratively processing the training data about football games played during a particular football season, individual phases (states), such as touchdown, interception or fumble, of a typical football game can be identified.

In an embodiment, a modified network model is a modified Hidden Markov Model (HMM). In another embodiment, a modified network model is a modified complex Dynamic Bayesian Networks Model (DBNM). Other models can also be modified to perform the steps of the method presented herein.

In an embodiment, modifications to a basic network model are extensive and pertain to various aspects of the model. The modifications take into account a bursting nature of event-related texts. For example, more texts (tweets) are usually generated during a touchdown or field goal in a football game than during a fumble or penalty. The presented modifications to the basic network model ensure that the event summary does not contain texts from the periods of low activity, and at the same time, ensure that the event summary does not over-represent the periods the most active periods.

The modifications also take into account the fact that separate sub-events may not be temporally far apart from each other. In particular, the modifications allow separating different types of sub-events even when the sub-events are temporally close to each other.

Furthermore, the modifications take into account previous instances of similar events described in training data such as event-and-time-specific texts that are contextually related to a plurality of events. In particular, the modifications allow building an offline model for the different sub-events using the training data from the past events.

Moreover, the modifications allow eliminating the texts that contain very little meaningful content. For example, the texts that are too short to contain some meaningful content are not used to generate a modified network model. Also, the texts that contain spelling errors are omitted from being used to generate the modified network model. Similarly, the texts that contain mostly general, not-event-specific vocabulary are also not used to generate the modified network model.

In an embodiment, empirical data for the modified network model demonstrate a high level of accuracy in refining the parameters of the model. The modified model is widely adaptive to various event-analysis applications and can be implemented to events of various characteristics.

In an embodiment, once generated, a modified network model is used to process a set of additional texts to determine a subset of the additional texts that provide the most representative summary of the stages of the event and thus can be the most interesting to the users. For example, the additional data can comprise a plurality of additional event-and-time-specific texts that are contextually related to a particular football game. The additional data are processed using the modified network model to identify a particular set of texts that belong to a particular phase (state) of the football game. The particular set of texts is further processed to identify one or more texts that are the most representative of the texts related to the particular phase of the game.

In an embodiment, the modified network model approach can be implemented to analyze texts contextually related to repetitive events, such sport games, festivals, award shows, political elections, and anniversaries, as well as unpredictable events, such as political revolutions, natural disasters, and medical and technological achievements.

FIG. 1 illustrates an embodiment of a search engine environment 100. The search engine environment 100 comprises one or more search engines 120, one or more databases 120, one or more users 140a through 140n, and one or more social media tracking services 160. Other components, such as servers, routers, data repositories, data clouds, can be included in the search engine environment 100.

In an embodiment, a search engine 120 is configured to collect information available on the Internet, process the collected information and store the processed information in storage, such as a database 130. Search engine 120 can be further configured to receive a search query, process the search query and return search results in response to receiving the query.

Search engine 120 can implement the functional units that are shown within the search engine 120, and the processes described herein, using hardware logic such as in an application-specific integrated circuit (ASIC), field-programmable gate array (FPGA), system-on-a-chip (SoC) or other combinations of hardware, firmware and/or software.

In an embodiment, search engine 120 comprises one or more processors 102, one or more document search units 104, one or more vocabulary units 106, one or more model units 108, one or more summarizing units 110 and one or more presenting units 112.

In an embodiment, one or more processors 102 perform various functions specific to search engine 120. For example, processors 102 can process requests received at search engine 120, direct the requests to the specific units of search engine 120, communicate error messages between the units, implement various auxiliary functions and perform operating system functions within search engine 120.

In an embodiment, one or more document search units 104 are configured to receive search queries, process the search queries, determine search results for the search queries and return the search results in response to received search queries. For example, upon receiving a search query from a user 140*a*, document search unit 104 can parse the search query, generate an execution plan for the search query, execute the execution plan for the search query, determine one or more search results for the search query and store the search results in a database 130.

In an embodiment, a document search unit 104 is configured to search documents over the Internet, perform functionality of a crawler, and/or collect and index information available on the Internet. The collected and indexed information can be stored in a database 130.

In an embodiment, document search unit 104 is configured to process the search results by parsing the search results, determining the search results that are the most relevant to the received search query, and ordering the search results according to a reverse-chronological order determined based on the posting dates of the individual search results.

In an embodiment, document search unit 104 is configured to transmit the search results to other units of a search engine 120. For example, document search unit 104 can be configured to transmit the search results to a model unit 108 to generate a modified network model from the texts in the search results.

In an embodiment, generating a modified network model comprises defining one or more sets of vocabulary from training data specific to a plurality of events and defining a plurality of states and links between the states. The training data can comprise a plurality of event-and-time-specific texts that are contextually related to a plurality of events. Examples of training data can include tweets, blogs and other textual information exchanged between users.

In an embodiment, training data can be provided in a form of data stream, and can include event-and-time-specific tweets, blogs or other texts contextually related to events such as a football season, a Grammy Awards, or others.

Figure 2:
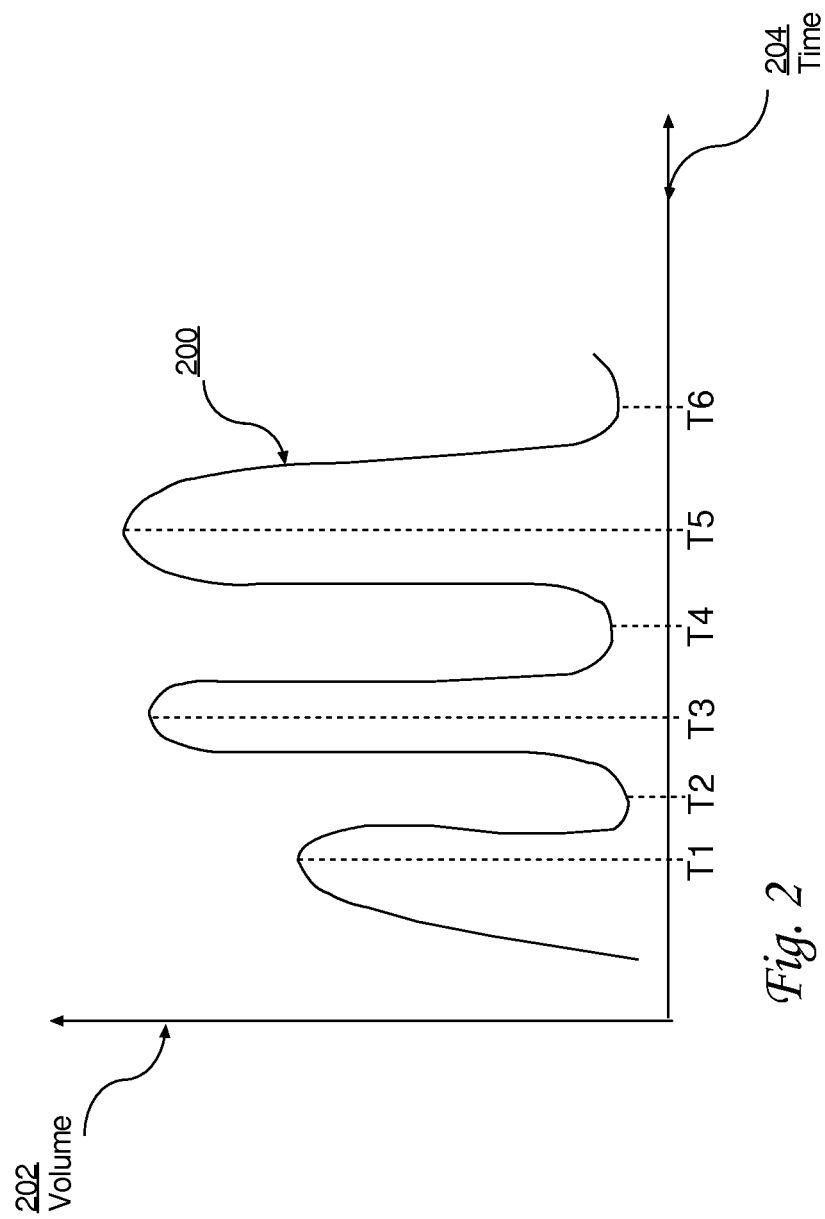
FIG. 2 illustrates an embodiment of a stream of training data provided over time.

FIG. 2 illustrates an embodiment of a stream of training data 200 provided over some period of time. An axis 202 indicates a volume of the stream of training data 200, while an axis 204 indicates a time duration during which the stream of training data 200 was collected and provided to model unit 108.

Characteristics of the volume of the training data 200 can vary and can depend on the type of the training data 200, the type of events and the type of the data gathering approach. As depicted in FIG. 2, the volume of training data 200 changes as the time passes, indicating that training data 200 are provided to model unit 108 in waves.

As depicted in FIG. 2, relatively large amounts of training data 200 are provided to model unit 108 at times T1, T3 and T5, while relatively small amounts of the training data 200 are provided to model unit 108 at times T2, T4, T6.

Changes in the volume of the training data 200 for a particular event can be interpreted in a variety of ways. For example, a high volume of the training data 200 for a particular event can be caused by a sudden and significant development in the particular event, which triggers a sudden burst in the amount of texts (tweets, blogs, and messages) that the users send to each other. In an example specific to a football game, an event such as a touchdown can cause a sudden increase in the volume of tweets that the users post to a social media site. That that can cause an increase in the volume of the training data 200 collected for the game. The sudden or significant developments in the particular event can be referred to as states or stages of the event. The states for the events related to, for example, a football season, can comprise different phases that can be identified in an individual football game, such as touchdown, interception, fumble, field goal or others.

Referring again to FIG. 1, in an embodiment, a vocabulary unit 106 is configured to receive training data related to a plurality of events from other units of search engine 120, and use the training data to generate one or more sets of vocabulary specific to the particular events. Vocabulary unit 106 can be a part of model unit 108, or can be an autonomous unit that is communicatively coupled with model unit 108.

In an embodiment, vocabulary unit 106 parses the received training data to generate a generic vocabulary, state-specific vocabulary, state-and-event-specific vocabulary and any other type of vocabulary that can be useful in generating a modified network model by search engine 120.

A generic vocabulary can include common words and phrases uttered in texts of the training data. That includes the words that do not seem to be specific to particular events, particular states, particular entities, particular individuals, or other particular types of information. For example, in the text "The 49ers is the oldest major professional sports team in California," the words/phrases "is," "the oldest," "major," "professional," "sports," "team" and "in" can be classified as generic.

A state-specific vocabulary can include the words and phrases that are specific a particular phase of the events, particular state of the game, particular entity identified in the event, or other particular information related to a state of the event. For example, in the text "The 49ers first touchdown was scored by Len Eshmont," the word "touchdown" can be classified as a state-specific word because it is related to a specific phase in a football game.

A state-and-event-specific vocabulary can include the words that are not only specific to a particular phase of the event, but also a particular element of the event, such as a particular game. For example, in the text "The 49ers next game is on Sep. 11, 2011," the phrase "Sep. 11, 2011" can be classified as a state-and-event-specific phrase.

Referring again to FIG. 1, in an embodiment, vocabulary unit 106 is configured to process training data to identify the generic words and phrases, the state-specific words and phrases and the state-and-event-specific words and to eliminate the words and phrases that usually contribute very little to the overall meaning of the texts in the training data.

In an embodiment, model unit 108 is configured to receive various types of information to generate a modified network model for the corpus of the information. For example, model unit 108 can use training data that comprise a plurality of event-and-time-specific texts that are contextually related to a plurality of events, to generate a modified network model that defines a plurality of states specific to the plurality of events. Examples of training data can include tweets, blogs and other textual information exchanged between users.

Referring again to FIG. 1, in an embodiment, a model unit 108 is configured to generate a modified network model for state-and-event specific texts in a plurality of texts. In an embodiment, generating a modified network model comprises receiving training data, such as event-and-time-specific texts, that are contextually related to a plurality of events, determining various types of vocabulary sets based on the training data, and iteratively processing the training data to determine one or more states of the model. Each of the states represents a unique phase of a particular event. In additional to the identified states, the modified network model also comprises information about transitions from one state to another state if such transition are probable based on the training data.

A modified network model can be obtained by modifying a Hidden Markov Model (HMM), modifying a complex Dynamic Bayesian Network Model (DBNM) or modifying other network model. The modifications can be quite extensive and complex to accommodate the extensive use of additional parameters, not used in the basic model, and to accommodate iterative processing of a multiplicity of inputs at each steps of the model generating process.

In an embodiment, to generate a modified network model, model unit 108 communicates with a vocabulary unit 106 by sending training data for a plurality of events to vocabulary unit 106, requesting that vocabulary unit 106 generate a vocabulary specific to the training data, and receiving the sets of vocabulary. Upon receiving the sets of vocabulary, model unit 108 can generate a modified network model that is specific to the plurality of events.

A modified network model comprises one or more states that are specific to the events for which the model is built. The states are determined based on training data provided to model unit 108. For example, for texts, such as tweets pertaining to football games, model unit 108 can generate a modified network model that can comprise various phases of a typical football game. The phases, also referred to as states, can comprise such states as a touchdown state, an interception state, a fumble state, a field goal state and other states.

In an embodiment, model unit 108 generates a set of states specific to the training data for a particular event and identifies links between the states.

Figure 3:
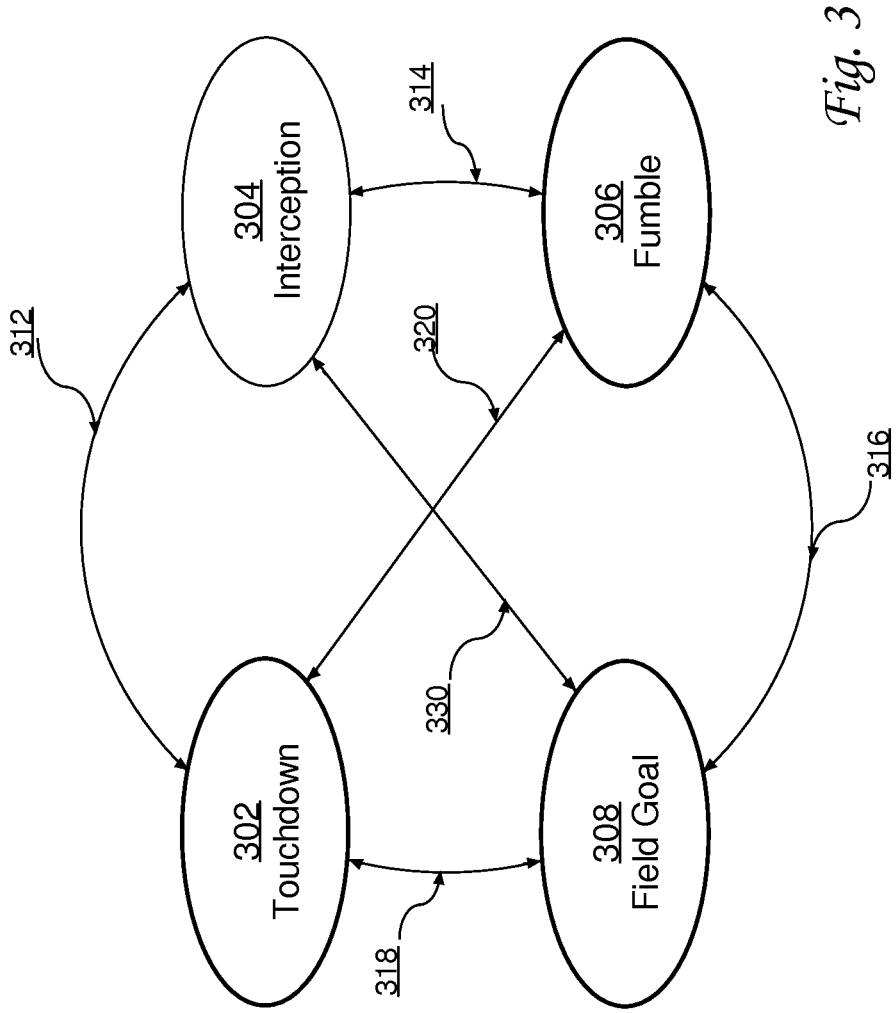
FIG. 3 illustrates an embodiment of states identified for an event.

FIG. 3 illustrates an embodiment of a set of states identified by model unit 108 for a particular event. The example pertains to a football game event. The examples of the states include a touchdown 302, an interception 304, a fumble 306 and a field goal 308. Other or additional states can also be identified. The links that join the respective states include a link 312 between states 302 and 304, a link 314 between states 304 and 306, a link 316 between states 306 and 308, a link 318 between states 308 and 302, a link 320 between states 302 and 306 and a link 330 between states 304 and 308.

As depicted in FIG. 3, the links can be bi-directional. However, in other examples of states generated for a modified network model, some of the links can be unidirectional. In some cases, some of the states can have the links established with some of the other states but not with all other states.

Interpretation of the state-and-link model depends on the characteristics of the related events. In the example of the states identified for a football game, as depicted in FIG. 3, it is probable that from each of the states (touchdown, interception, fumble and field goal), the game can proceed to any of the other states. For example, from state 302 (touchdown), the football game can proceed to an interception (state 304), a fumble (state 306), a field goal (state 308) or to another touchdown (state 302). Each transition can have assigned a probability that determines likelihood that such a transition can actually take place.

Referring again to FIG. 1, in an embodiment, a summarizing unit 110 uses the modified network model to identify a particular set of texts that belong to a particular state of states and to identify, within the particular set of texts, one or more texts that are the most representative of all texts in the particular set of texts. In an embodiment, identifying the particular set of texts comprises receiving additional data that are contextually related to a particular event, and processing the additional data by applying the modified network model to the additional data.

In an embodiment, the additional data comprise a plurality of additional event-and-time-specific texts that are contextually related to a particular event, which was included in a plurality of events for which the modified network model was generated. For example, training data that comprise event-and-time-specific texts related to a plurality of events can be used to generate a modified network model, while additional event-and-time-specific texts can be used to identify a particular set of texts and those texts that are the most representative of the additional data. In even more concrete example, training data, such as tweets related to football games for the 2010 season, can be used to generate a modified network model, while additional texts, such as tweets related to a particular football game of 2011, can be used to identify those tweets related to the particular football game of 2011 that are the most representative of the tweets related to the particular football game of 2011.

In an embodiment, a presenting unit 112 is configured to receive the results generated by summarizing unit 110 and to present the results to the user. For example, presenting unit 112 can receive the texts that were identified as the most representative of all texts in a particular set of texts that belong to a particular state in a modified network model generated for a plurality of events. The results can be presented in a form of a list of hyperlinks to the results. The list can be ordered based on the representativeness of the respective content or based on other criteria determined by search engine 120.

In an embodiment, a network 150 is configured to transmit information between search engine 120, users 140a through 140n and social media tracking services 160. Network 150 is communicatively coupled to search engine 120, users 140a through 140n, social media tracking services 160 and other devices in system 100, and is configured to implement communications protocols, such as TCP or others.

In an embodiment, users 140a through 140n are users that communicate with each other by exchanging textual messages between each other, visiting social media sites and networks, or participating in information exchange in any other form. Users 140a through 140n can use mobile devices, smartphones, laptops, desktop computers, and other devices that allow sending and receiving textual content.

In an embodiment, users 140a through 140n can be members of social media sites. Social media include media for social interaction, and are usually using highly accessible and scalable communication techniques. Social media often refers to the use of web-based and mobile technologies to turn communication into interactive dialogue. Social media can also be defined as a group of Internet-based applications that allow the creation and exchange of user-generated content. A common thread running through all definitions of social media is a blending of technology and social interaction for the co-creation of value. Examples of social media sites include Facebook™, Twitter™, and YouTube™.

In an embodiment, one or more social media tracking services 160 are included in the system 100. Social media tracking services 160 comprise various services related to providing training data to search engine 120, providing additional data to search engine 120, processing information exchanged between users 140a through 140n and search engine 120, and other type of processing useful for the system 100.

In an embodiment, social media tracking services 160 provide texts to search engine 120. The texts, such as tweets, can be collected using a variety of approaches. For example, the tweets can be intercepted by various software applications residing on servers or other specialized computers. According to another example, the tweets can be provided from a social media Firehose™.

Social media tracking services 160 can include search applications for tracking brand or product mentions on a various social media sites, including flickr, Twitter, friendfeed, dig, etc. They usually allow tracking various types of the brands and products. Tracking can require providing the key words and separating the key words using comas. The tracked texts can be ported to search engine 120 for further processing, including using the tracked texts to generate a modified network model, described above.

3.0 State Model

In an embodiment, an event summarization processes comprises two parts. The first part pertains to detecting states (also referred to as stages or segments) of an event. The second part pertains to summarizing the texts for each stage.

In an embodiment, detecting states of an event pertains to detecting one or more phases that an event. For example, examples of different states in a game of football can include touchdown, interception, fumble and field goal. It has been noticed that the volume of tweets varies if the game entered any of the particular states. For example, periods of significant tweeting activity usually occur when, for example, a team scores a touchdown; while periods of significant tweeting inactivity usually occur when, for example, a game broadcaster provides some general comments about the event, players or coaches.

The periods of significant tweeting activity might be interleaved with periods of significant tweeting inactivity. Accurate knowledge of the boundaries between stages can be critical in finding the most representative tweets for each of the most important states of the event.

In an embodiment, detecting one or more states (phases) of an event is referred to as segmentation of the event. Segmentation of an event into states can be performed using a variety of approaches, such as a modified approach based on the Hidden Markov Model (HMM) or based on more complex models, such a Dynamic Bayesian Network Model (DBNM).

One of the characteristics of a modified network model for a particular event is the ability to automatically learn the language used to describe the particular model. Another characteristic of the modified network model is the type of the model parameters that are used to indicate different phases of the event. The specific characteristics can be used to extensively modify a basic model, such as the Hidden Markov Model (HMM) to generate a modified network model customized to a plurality of particular events.

The Hidden Markov Model (HMM) is a statistical Markov model in which a state-link-system is modeled using a Markov process with unobserved (hidden) states. An HMM can be considered as the simplest dynamic Bayesian network.

In its discrete form, the HMM process can be visualized as a generalization of an urn problem known in statistics. For instance, three balls labeled y1, y2, y3 are drawn from the urns X1, X2, X3 in a dark room and put on a conveyor belt. The sequence of the balls, but not the sequence of urns from which they were chosen, is observed. The choice of the urn for the n-th ball depends upon only a random number and the choice of the urn for the (n−1)-th ball. The choice of the urns does not directly depend on the urns further previous. Determining a set of the urns can be referred to as solving a Markov process problem.

Because the Markov process itself cannot be observed, and only the sequence of labeled balls can be observed, the problem is referred to as a "hidden Markov process." Referring again to the urn-problem, even if a researcher knows the composition of the urns and has just observed a sequence of three balls y1, y1 and y1 on the conveyor belt, the researcher still cannot be sure from which urn (from which state) the third ball was drawn. However, the researcher can work out other details, such as the identity of the urn from which the third ball was drawn.

In a regular Markov model, the state is directly visible to the observer, and therefore the state transition probabilities are the only parameters. In a hidden Markov model, the state is not directly visible; however, the output, dependent on the state, is visible. Each state has a probability distribution over the possible output tokens. Therefore the sequence of tokens generated by an HMM gives some information about the sequence of states. The adjective hidden refers to the state sequence through which the model passes, not to the parameters of the model; even if the model parameters are known exactly, the model is still hidden.

Hidden Markov models are especially known for their application in temporal pattern recognition such as speech, handwriting, gesture recognition, part-of-speech tagging, musical score following, partial discharges and bioinformatics.

A hidden Markov model can be considered a generalization of a mixture model where the hidden variables (or latent variables), which control the mixture component to be selected for each observation, are related through a Markov process rather than independent of each other.

The standard HMM comprises N states, labeled $S_1$ through $S_N$, a set of observation symbols $v_1$ through $v_M$, a set of probabilities $bi(k)$ of observing symbol k while in state i, a set of probabilities $a_{ij}$ of transitioning from state i to state j, and the initial state distribution $\pi_i$. Starting from an initial state, the HMM outputs a symbol selected according to the symbol probabilities for that state, and then transitions to another state based on the transition probabilities (self-transitions are allowed). Given several sequences of symbols, the symbol and transition probabilities of the HMM that best fit the observed sequences are determined.

For example, if an event is a football game, then each state can correspond to one class of sub-events, such as a "touchdown", "interception," "fumble" or "field goal." The symbols can correspond to the words used in texts, such as tweets. Thus, the event-based HMM approach can be used to model each event as a sequence of states, with tweets being the observations generated by the states. The variation in symbol probabilities across different states can account for the different "language models" used by the texts users to describe different classes of sub-events. The transitions between states can model the chain of sub-events over time that together make up any given event.

Figure 4:
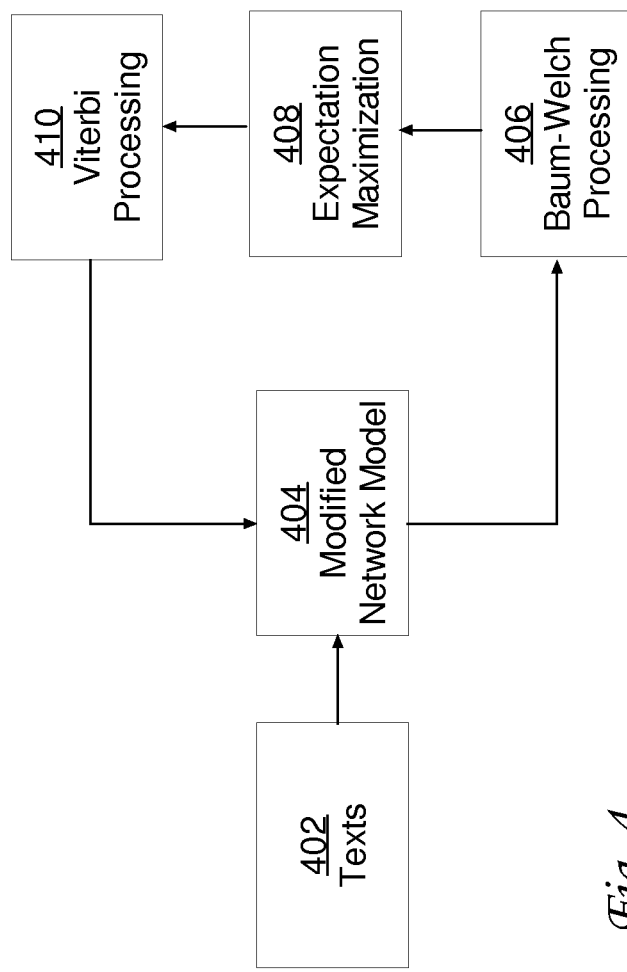
FIG. 4 illustrates an embodiment of generating a modified network model.

FIG. 4 illustrates an embodiment of generating a modified network model 404. Generating a modified network model 404 is an iterative process and comprises executing a sequence of algorithms until the results do not seem to be improved by a subsequent execution of the sequence of the algorithms. As depicted in FIG. 4, a modified network model 404 is generated based on the texts 402, and by repeating processing of algorithms 406-410, described below.

In an embodiment, event-and-time-specific texts 402 are provided. The event-and-time-specific texts can comprise tweets, blogs and other textual information contextually related to a plurality of events. For example, the event-and-time-specific texts can comprise tweets that pertain to a football season of 2011. The event-and-time-specific texts used to generate a modified network model 404 are referred to as training data.

A modified network model 404 is generated by iteratively processing training data, related to a plurality of events, and defining a plurality of states specific to the plurality of events. The details of processing the training data and the states were described above.

In an embodiment, generating a modified network model 404 includes executing various processes. For example, generating the modified network model 404 can comprise performing a Baum-Welch algorithm processing 406, an expectation maximization algorithm 408, a Viterbi algorithm 410, and other types of processing necessary to determine states in a modified network model. The processing 406-410 is described below.

In an embodiment, generating a modified network model 404 comprises executing the Baum-Welch algorithm 406. In electrical engineering, computer science, statistical computing and bioinformatics, the Baum-Welch algorithm is used to find the unknown parameters of a hidden Markov model (HMM).

The Baum-Welch algorithm uses the forward-backward algorithm. It is a particular case of a generalized expectation-maximization (GEM) algorithm. It can compute maximum likelihood estimates and posterior mode estimates for the parameters (transition and emission probabilities) of an HMM, when given only emissions as training data.

In the Baum-Welch algorithm, for a given cell $S_i$ in the transition matrix, all paths to that cell are summed. There is a link (transition from that cell to a cell $S_j$). The joint probability of $S_i$, the link, and $S_j$ can be calculated and normalized by the probability of the entire string. In the next step, the probability of all paths with all links emanating from $S_i$ is calculated. The results are normalized.

The Baum-Welch algorithm is performed to determine probabilities for identifying particular states in a modified network model and probabilities for transitions between the states in the modified network model.

In an embodiment, generating a modified network model 404 comprises executing an expectation-maximization (EM) algorithm 408. In statistics, an expectation-maximization (EM) algorithm is a method for finding maximum likelihood or maximum a posteriori (MAP) estimates of parameters in statistical models, where the model depends on unobserved latent variables. The EM is an iterative method which alternates between performing an expectation (E) step, which computes the expectation of the log-likelihood evaluated using the current estimate for the latent variables, and a maximization step (M), which computes parameters maximizing the expected log-likelihood found on the E step. These parameter-estimates are then used to determine the distribution of the latent variables in the next E step.

The expectation-maximization algorithm is performed to determine probabilities for identifying particular states in a modified network model and probabilities for transitions between the states in the modified network model.

In an embodiment, generating a modified network model 404 comprises executing the Viterbi algorithm 410. The Viterbi algorithm is a dynamic programming algorithm for finding the most likely sequence of hidden states. The sequence of the hidden states is referred to as the Viterbi path.

The Viterbi algorithm has a wide application in solving various mathematical problems, especially in the context of Markov information sources, and more generally, hidden Markov models. The Viterbi algorithm belongs to the realm of information theory.

The Viterbi algorithm is performed to determine one or more states of the related events based on training data comprising event-and-time-specific texts contextually related to a plurality of events.

4.0 Processing Event-and-Time-Specific Texts

In an embodiment, a standard Hidden Markov Model (HMM) approach is modified and enhanced to customize the HMM approach for the purpose of determining states of an event.

In an embodiment, a modified HMM approach is developed by modifying the standard HMM to accept a plurality of observation symbols in the HMM. While the standard HMM considers one observation symbol during an iteration cycle, the modified HMM allows considering a plurality of symbols. In the standard HMM, the observation from a given state consists of one symbol, while the observation from a given state in the modified HMM consists of all tweets for that time period. Hence, a plurality of symbols, instead of just one symbol, can be provided to the modified HMM. Therefore, a plurality of tweets, instead of just one tweet can be provided to the modified HMM.

In an embodiment, a modified HMM approach allows detecting bursts in volume of the texts sent over the Internet. Because the standard HMM does not account for different rates of tweets over time, it only outputs one symbol per time-step. Thus, the standard HMM is unable to model bursts of tweet volume. In the modified HMM approach, each state can have its own "tweet rate," which models the expected fraction of tweets associated with a particular state of a particular state. Introduction of separate tweet rates allows for differentiation between states on the basis of the "burstiness" of the tweet-stream.

In an embodiment, a modified HMM approach allows combining information from multiple events. In the standard HMM, in order to learn the parameters of the HMM, several observation sequences generated by the HMM are required. That approach suffers from the problem of cold-start: every time there is a change in observation sequences, a new model of the data must be generated, causing injecting a time lag before a next change-point can be detected.

Also, since the change-point system can only model the tweets received in the past, it can be slow to register when a new class of sub-event occurs.

Such inadequate modeling of each event by itself is one of the motivations to modify the standard HMM to be able to learn the HMM parameters by training the model using all available events of a certain type. For example, instead of training the model using the tweets from just one football game, it is preferable to train the model using tweets from all football games in a season. Since all football games share the same classes of sub-events, such as a "touchdown," or an "interception," combining the data from multiple events can improve the process of learning the HMM parameters, and can improve the process of detecting state transitions in a new game, thus solving the cold-start problem.

In an embodiment, a modified HMM approach also overcomes the problem of taking into account the tweet words that only occur in some of the events, but not in others. The most common example of such a problem is processing of the proper names in the tweets. For example, tweets about two different football games will unlikely share player names or team names. However, the names of the players and teams could be very important in distinguishing between states as certain players who only play in a defense or only in an offense.

The modified HMM approach solves that problem by differentiating symbol probabilities across specific events. In an embodiment, three sets of symbol probabilities are maintained: (1) $\theta^{(s)}$, which is specific to each state but is the same for all events, (2) $\theta^{(sg)}$, which is specific to a particular state for a particular game, and (3) $\theta^{(bg)}$, which is a background distribution of symbols over all states and games. Thus, $\theta^{(s)}$ encapsulates different classes of sub-events, while $\theta^{(sg)}$ captures proper names and other symbols that can vary across games but still give some signal regarding the correct state; finally, $\theta^{(bg)}$ handles all irrelevant tweets. The standard HMM uses only $\theta^{(s)}$. The differentiation of symbol probabilities, across specific events, is another aspect of the modified HMM that distinguishes the modified HMM from the standard HMM.

Figure 5:
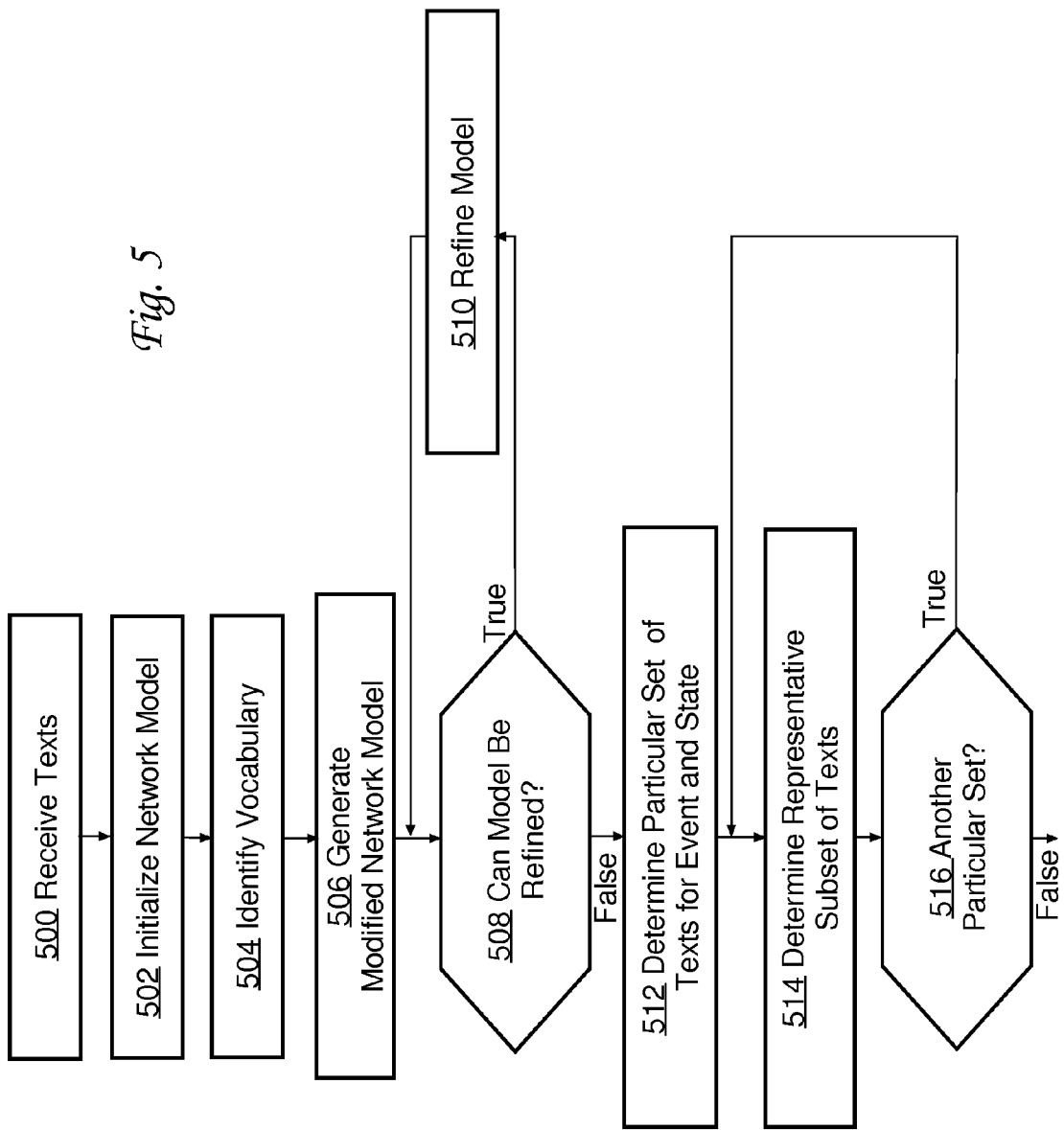
FIG. 5 illustrates an embodiment of processing texts.

FIG. 5 illustrates an embodiment of processing texts to determine one or more texts that are the most representative for a particular set of texts contextually related to a particular event from a plurality of events.

In step 500, one or more texts are received. The one or more texts comprise training data such as event-and-time-specific texts that are contextually related to a plurality of events. In the example pertaining to football season of 2010, the training data can comprise tweets that were tracked and collected by a social media tracking system and that were related to the football games played during the football season of 2010.

In step 502, an initial network model is initialized. That can include initializing various variables for the model, defining various constants and variables, and performing other necessary initialization functions.

In step 504, vocabulary for the modified network model is initialized. Various types of vocabulary sets were described above. The vocabulary sets can be initialized based on training data described above.

In step 506, a modified network model is generated. The modified network model can be generated by iteratively processing the received training data to identify one or more states that are specific to the events for which the training data were obtained. The details of generating the modified network model and the states for the modified network model were described above.

In step 508, it is determined whether the model can be refined. For example, it can be determined whether additional states can be identified, or whether the already identified states are misidentified and the state identification process needs to be repeated. If the model can be refined, then the process proceeds to step 510, in which further refining of the model is performed. The refining of the model can involve adjusting the parameters of the model and regenerating the modified network model using, for example, the training texts, as described above. However, if the model cannot be further refined, then the process proceeds to step 512.

In step 512, a particular set of texts for a particular event and a particular state of the modified network model is determined. For example, if the particular event pertains to a particular football game played by The 49ers on September of 2011, and the particular state pertains to a particular touchdown in that game, then the particular set of texts for that game can comprise the texts that describe the particular touchdown in the game played by The 49ers on September of 2011.

In an embodiment, determining a particular set of texts is performed upon receiving additional data that comprise a plurality of additional event-and-time-specific texts that are contextually related to a particular event. The additional texts can be different from the training data used to generate the modified network model. For example, while the training data can comprise texts that are contextually related to football games played during the 2010 football season, the additional data can comprise texts that are contextually related to one or more football games played in September of 2011.

For example, in the case of processing tweets for football events, determining a particular set of texts can be performed by using a modified network model and additional tweets for one or more football games to associate one or more tweets, from the additional tweets, with one or more states of the modified model. Associating the one or more tweets with the one or more states of the modified model allows dividing the additional tweets into groups based on their association with respective states.

Once one or more additional texts are associated with one or more states of the modified model, contents of the additional texts associated with a particular state are summarized. The summary can be generated by identifying key words and phrases in the respective texts, and identifying a set of concepts that the respective texts describe.

In an embodiment, a summary provides a comprehensive digest of the concepts described in a particular set of texts associated with a particular state and a particular event. For example, in the case of processing tweets for football events, for a particular event, such as the game of The 49ers played in September of 2011, and for a particular state, such as the first touchdown, a summary can provide a digest of the facts taking place during the first touchdown scored in the game played by The 49ers in September 2011.

In an embodiment, determining a particular set of texts for a particular event and a particular state comprises eliminating the texts that do not contribute any significant information to the description of the particular event and the particular state. Such texts can be referred to as irrelevant texts.

There are many reasons for receiving irrelevant texts in search results generated for a search query. For example, the irrelevant texts can comprise spam texts, texts comprising viruses, and other illegitimate texts. Other examples of the irrelevant texts can include texts that are too short or too long to appear to be useful. For example, the texts that contain less than minimum threshold of words but less than a maximum threshold of words are considered irrelevant texts. Furthermore, a threshold for the number of occurrences of words is employed to determine irrelevant texts. For example, the texts that contain words repeated less than five times but no more than 90% of the time are removed.

While the above described approaches cause removing most of the irrelevant texts from a particular set of texts, some of the remaining texts in the particular set can still not be strictly relevant to a particular event and to particular state. Examples of such texts can include texts in which the text-writer expresses his enthusiasm/criticism directed to a particular team, game, players and/or coaches, but provides very few facts about the particular team, game, players and/or coaches.

In step 514, a representative subset of texts from a particular set of texts is determined. In an embodiment, the approach is focused on summarizing textual content, and assumes that the problem of searching the texts relevant to a user query should return those texts that are representative of a particular state of a particular event identified in the user search query. For example, the representative subset of texts from the particular set of texts can comprise those texts that provide the most facts identified in the summary, or those texts that describe the facts in the summary in the most representative manner.

In an embodiment, a representative subset of texts is provided to a user in a form of search results. By providing the representative subset of texts for a particular event and a particular state of the event, the user receives the search results that are indeed representative of the particular event and the particular state of the event. The representative subset of texts does not include the irrelevant texts and other texts that can marginally contribute to the description of the particular event and the particular state of the event.

In step 516, it is determined if another particular set of texts can be identified based on the additional data and the modified network model, similarly as it was described in step 512. If another particular set of texts can be identified, then the process proceeds to step 514. Otherwise, the processing of the texts is completed.

5.0 Processing Search Results to Return Representative Texts

In an embodiment, the approach for processing event-and-time specific texts to determine one or more representative texts can be implemented in a variety of applications, such as text analysis, query analysis and search result analysis.

In an embodiment, analyzing search results received for a search query comprises pruning the search results to eliminate those search results that unlikely provide the information that are sought by the search query and to identify those search results that representatively summarize a particular event and a particular state of the event that the user is interested in.

Figure 6:
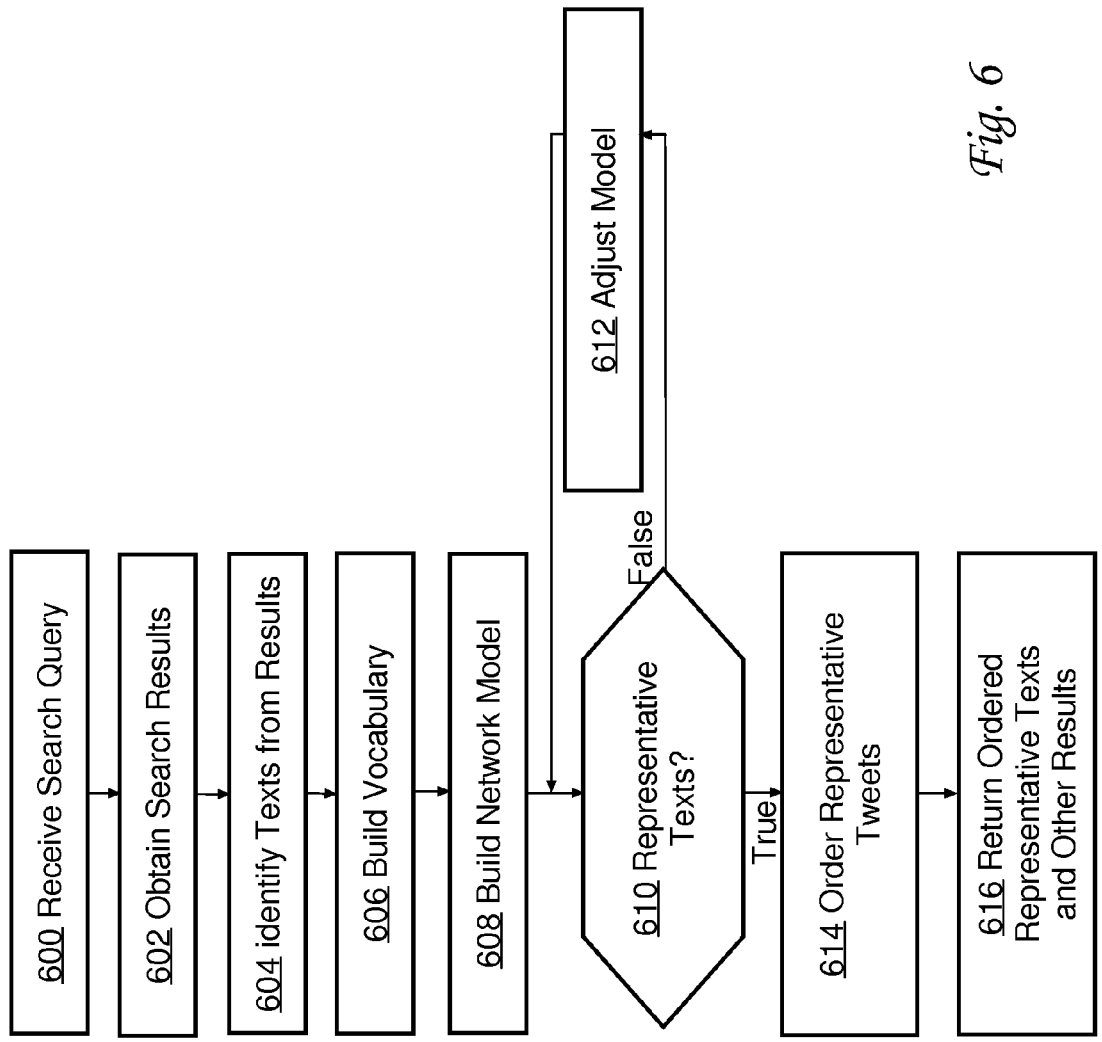
FIG. 6 illustrates an embodiment of processing a search query to identify representative texts.

FIG. 6 illustrates an embodiment of processing a search query to identify representative texts. In step 600, a search query is received. The search query can be issued by a user, by an application, by a system or any other entity requesting information. The search query can be issued to a search engine, a database or any other entity capable of processing search queries. The search query can be in any known query format and can pertain to any type of information.

In step 602, a search engine processes and executes the search query, and generates search results for the query. The search results can comprise a list of hyperlinks to documents, texts (tweets, blogs, and emails) and other electronic data that are stored in various storages and available over the Internet.

In step 604, the search results are processed and texts, such as tweets, blogs and other textual information are identified using the hyperlinks included in the search results. For example, if the search results comprise links to tweets, the tweets are retrieved and downloaded to storage associated with the search engine. The texts identified at this point are referred to as training data. The training data were described in detail above.

In step 606, one or more sets of vocabulary are generated from the identified texts. The process of building the vocabulary was described in detail above.

In step 608, a modified network model is built based on the training data described above. Building the modified network model comprises an iterative process of processing the training data to determine one or more states for the model and one or more corresponding links between the states for the model. The modified network model and the process of building the modified network model are described above.

In step 610, representative texts in event-and-time-specific texts are identified. The event-and-time-specific texts can be additional data, such as additional search results generated to another search query. Alternatively, the event-and-time-specific texts can be the same training data, determined from the first search query described above. If the texts used in step 610 are additional data, then step 610 is most likely perform online and is designed to process and improve search results generated in response to queries received from users. However, if the texts used in step 610 are the training data, then step 610 can be executed as the model is refined and improved.

In an embodiment, the representative texts are determined in step 610 from additional data that are contextually related to a plurality of events. For example, the additional data can comprise search results generated for a user query, in which the user requested information about a particular football game and a particular phase (state) of the game. More detailed examples are described above.

Determining one or more representative texts comprises determining a particular set of texts for a particular event and a particular state of the event (as described in step 512 of FIG. 5), and determining a representative subset of texts from the particular set of texts (as described in step 514 of FIG. 5). The one or more representative texts are selected as those that the most representatively describe the particular event and the particular state of the event, and thus the most representatively answer the received search query.

In step 610, a test is performed whether one or more representative texts have been identified in the training data. If such texts have been identified in the training data, then the process proceeds to step 612, in which the modified network model is adjusted and the process of identifying the representative texts is repeated in step 610. However, if the representative texts have not been identified in the training data, then the process proceeds to step 614.

In step 614, a set of representative texts is ordered. Various criteria can be used to determine the order of the representative texts. For example, the representativeness of the texts can be measured by determining a representativeness score for each representative text, and by ordering the representative texts based on their associated score. According to another example, the representative texts can be ordered based on their length, based on the reputation of their respective sources, or any other factors.

In step 616, a set of the ordered representative texts and other search results generated in response to receiving a search query are returned to a user. The set of the ordered representative texts can be ordered, as described above.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
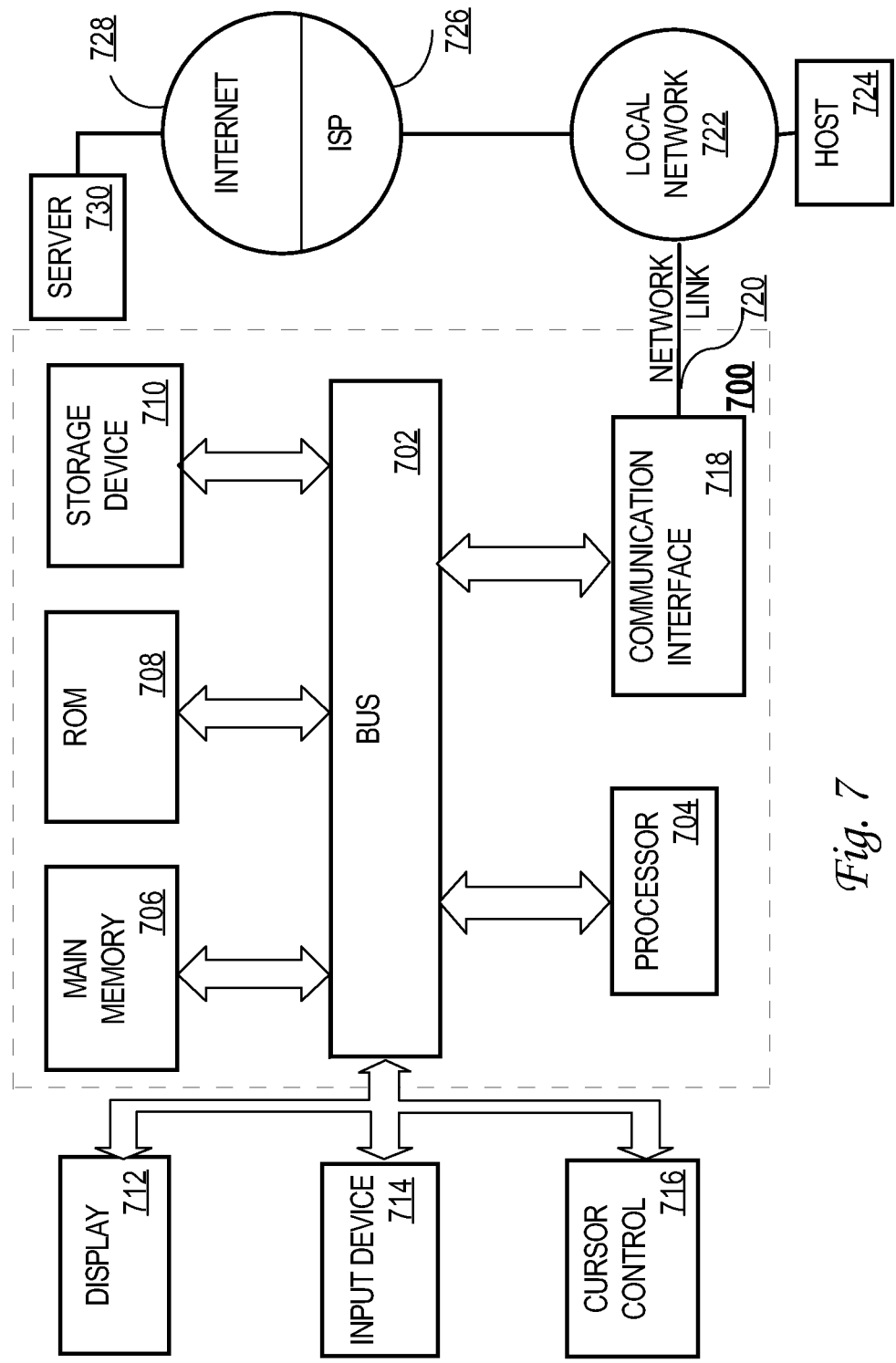
FIG. 7 illustrates a computer system on which embodiments may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (LCD, CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

7.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
    receiving training data that comprise a plurality of event-and-time-specific texts that are contextually related to a plurality of events;
    identifying, by iteratively processing the training data, a plurality of different states, each state corresponding to a different event from the plurality of events;
    generating a modified network model that comprises the plurality of states;
    receiving additional data that comprise a plurality of additional event-and-time-specific texts that are contextually related to a particular event;
    processing the additional data by applying the modified network model to the additional data to identify, within the plurality of additional event-and-time specific texts, a particular set of texts that belong to a particular state of the plurality of states; and
    identifying, within the particular set of texts, one or more texts that are most representative of all texts in the particular set of texts that belong to the particular state; and
    wherein the method is performed by one or more computing devices.

2. The method of claim 1, further comprising:
    generating a summary of an event that corresponds to the particular state, wherein the summary is based on the one or more texts that are most representative of all texts in the particular set of texts that belong to the particular state.

3. The method of claim 1, wherein the modified network model is any one of: a modified Hidden Markov Model (HMM) or a modified Dynamic Bayesian Networks Model (DBNM).

4. The method of claim 1, further comprising:
    initializing one or more elements of a network model;
    wherein iteratively processing the training data to generate the modified network model comprises determining one or more parameters of the network model;
    identifying a plurality of state-and-event-specific words for the event in a content of the plurality of event-and-time-specific texts; and
    including the plurality of state-and-event-specific words in determining the plurality of states within the event and iterating executing of the modified network model using the content of the plurality of event-and-time specific texts.

5. The method of claim 1, further comprising:
    determining unknown parameters of the modified network model using a Baum-Welch algorithm; and
    wherein the Baum-Welch algorithm computes maximum likelihood estimates and posterior mode estimates for the unknown parameters of the modified network model using training data.

6. The method of claim 1, further comprising:
    applying an expectation-maximization (EM) algorithm to iterate execution of the modified network model using a content of the plurality of event-and-time specific texts;
    wherein the EM algorithm computes an expectation of a log-likelihood for unknown parameters; and
    wherein the unknown parameters comprise a plurality of states.

7. The method of claim 1, further comprising:
    dividing the plurality of event-and-time-specific texts into segments based on a state associated with a particular event-and-time-specific text and a time associated with a particular event-and-time-specific text; and
    wherein the dividing of the plurality of event-and-time-specific texts into segments is performed by applying a Viterbi algorithm.

8. The method of claim 1, wherein determining the particular set of texts, from the plurality of event-and-time specific texts, comprises eliminating spam texts, texts that contain less than a minimum threshold of words, texts that contain more than a maximum threshold of words, and texts that do not meet a word repetition requirement.

9. The method of claim 1,
    wherein the plurality of event-and-time-specific texts comprises texts provided by social media search or tracking sites, including social media services;
    wherein the plurality of event-and-time-specific texts comprises texts generated by users; and
    wherein the plurality of event-and-time-specific texts relate to one or more sport events, concerts, political events, social events, or celebrity personalities.

10. The method comprising:
    receiving training data that comprise a plurality of event-and-time-specific texts that are contextually related to a plurality of events;
    determining one or more sets of vocabulary from the training data;
    based on the one or more sets of vocabulary and the training data, determining initial values for one or more parameters for a modified network model that defines a plurality of states for the plurality of events;
    initializing the modified network model using the initial values for the one or more parameters for the modified network model;
    iteratively processing the training data to refine the modified network model to identify one or more states for the modified network model;
    wherein the method is performed by one or more computing devices.

11. One or more non-transitory computer-readable storage media storing instructions which, when executed by one or more computing devices, cause:
    receiving training data that comprise a plurality of event-and-time-specific texts that are contextually related to a plurality of events;
    identifying, by iteratively processing the training data, a plurality of different states, each state corresponding to a different event from the plurality of events;
    generating a modified network model that comprises the plurality of states;
    receiving additional data that comprise a plurality of additional event-and-time-specific texts that are contextually related to a particular event;
    processing the additional data by applying the modified network model to the additional data to identify, within the plurality of additional event-and-time specific texts, a particular set of texts that belong to a particular state of the plurality of states; and
    identifying, within the particular set of texts, one or more texts that are most representative of all texts in the particular set of texts that belong to the particular state.

12. The one or more non-transitory computer-readable storage media of claim 11, storing additional instructions which, when executed by the one or more computing devices, cause:

generating a summary of an event that corresponds to the particular state, wherein the summary is based on the one or more texts that are most representative of all texts in the particular set of texts that belong to the particular state.

13. The one or more storage media of claim 11, wherein the modified network model is any one of: a modified Hidden Markov Model (HMM) or a modified Dynamic Bayesian Networks Model (DBNM).

14. The one or more non-transitory computer-readable storage media of claim 11, storing additional instructions which, when executed by the one or more computing devices, cause:
   initializing one or more elements of a network model;
   wherein iterative processing the training data to generate the modified network model comprises determining one or more parameters of the network model;
   identifying a plurality of state-and-event-specific words for the event in a content of the plurality of event-and-time-specific texts; and
   including the plurality of state-and-event-specific words in determining the plurality of states within the event and iterating executing of the modified network model using the content of the plurality of event-and-time specific texts.

15. The one or more non-transitory computer-readable storage media of claim 11, storing additional instructions which, when executed by the one or more computing devices, cause
   determining unknown parameters of the modified network model using a Baum-Welch algorithm; and
   wherein the Baum-Welch algorithm computes maximum likelihood estimates and posterior mode estimates for the unknown parameters of the modified network model using training data.

16. The one or more non-transitory computer-readable storage media of claim 11, storing additional instructions which, when executed by the one or more computing devices, cause:
   applying an expectation-maximization (EM) algorithm to iterate execution of the modified network model using a content of the plurality of event-and-time specific texts;
   wherein the EM algorithm computes an expectation of a log-likelihood for unknown parameters; and
   wherein the unknown parameters comprise a plurality of states.

17. The one or more non-transitory computer-readable storage media of claim 11, storing additional instructions which, when executed by the one or more computing devices, cause:
   dividing the plurality of event-and-time-specific texts into segments based on a state associated with a particular event-and-time-specific text and a time associated with a particular event-and-time-specific text; and
   wherein the dividing of the plurality of event-and-time-specific texts into segments is performed by applying a Viterbi algorithm.

18. The one or more non-transitory computer-readable storage media of claim 11, storing additional instructions which, when executed by the one or more computing devices, cause: eliminating spam texts, texts that contain less than a minimum threshold of words, texts that contain more than a maximum threshold of words, and texts that do not meet a word repetition requirement.

19. The one or more non-transitory computer-readable storage media of claim 11:
   wherein the plurality of event-and-time-specific texts comprises texts provided by social media search or tracking sites, including social media services;
   wherein the plurality of event-and-time-specific texts comprises texts generated by users; and
   wherein the plurality of event-and-time-specific texts relate to one or more sport events, concerts, political events, social events, or celebrity personalities.

20. A text processing system comprising at least one content server, wherein the at least one content server is configured to perform:
   receiving training data that comprise a plurality of event-and-time-specific texts that are contextually related to a plurality of events;
   identifying, by iteratively processing the training data, a plurality of different states, each state corresponding to a different event from the plurality of events;
   generating a modified network model that comprises the plurality of states;
   receiving additional data that comprise a plurality of additional event-and-time-specific texts that are contextually related to a particular event;
   processing the additional data by applying the modified network model to the additional data to identify, within the plurality of additional event-and-time specific texts, a particular set of texts that belong to a particular state of the plurality of states; and
   identifying, within the particular set of texts, one or more texts that are most representative of all texts in the particular set of texts that belong to the particular state.

21. The text processing system of claim 20, wherein the at least one content server is further configured to perform:
   generating a summary of an event that corresponds to the particular state, wherein the summary is based on the one or more texts that are most representative of all texts in the particular set of texts that belong to the particular state.

22. The text processing system of claim 20, wherein the modified network model is any one of: a modified Hidden Markov Model (HMM) or a modified Dynamic Bayesian Networks Model (DBNM).

23. The text processing system of claim 20, wherein the at least one content server is further configured to perform:
   initializing one or more elements of a network model;
   wherein iteratively processing the training data to generate the modified network model comprises determining one or more parameters of the network model;
   identifying a plurality of state-and-event-specific words for the event in a content of the plurality of event-and-time-specific texts; and
   including the plurality of state-and-event-specific words in determining the plurality of states within the event and iterating executing of the modified network model using the content of the plurality of event-and-time specific texts.

24. The text processing system of claim 20, wherein the at least one content server is further configured to perform:
   determining unknown parameters of the modified network model using a Baum-Welch algorithm; and
   wherein the Baum-Welch algorithm computes maximum likelihood estimates and posterior mode estimates for the unknown parameters of the modified network model using training data.

25. The text processing system of claim 20, wherein the at least one content server is further configured to perform:
- applying an expectation-maximization (EM) algorithm to iterate execution of the modified network model using a content of the plurality of event-and-time specific texts;
- wherein the EM algorithm computes an expectation of a log-likelihood for unknown parameters; and
- wherein the unknown parameters comprise a plurality of states.

26. The text processing system of claim 20, wherein the at least one content server is further configured to perform:
- dividing the plurality of event-and-time-specific texts into segments based on a state associated with a particular event-and-time-specific text and a time associated with a particular event-and-time-specific text; and
- wherein the dividing of the plurality of event-and-time-specific texts into segments is performed by applying a Viterbi algorithm.

27. The text processing system of claim 20, wherein the at least one content server is further configured to perform:
- eliminating spam texts, texts that contain less than a minimum threshold of words, texts that contain more than a maximum threshold of words, and texts that do not meet a word repetition requirement.

28. The text processing system of claim 20,
- wherein the plurality of event-and-time-specific texts comprises texts provided by social media search or tracking sites, including social media services;
- wherein the plurality of event-and-time-specific texts comprises texts generated by users; and
- wherein the plurality of event-and-time-specific texts relate to one or more sport events, concerts, political events, social events, or celebrity personalities.

* * * * *